Patented July 1, 1924.

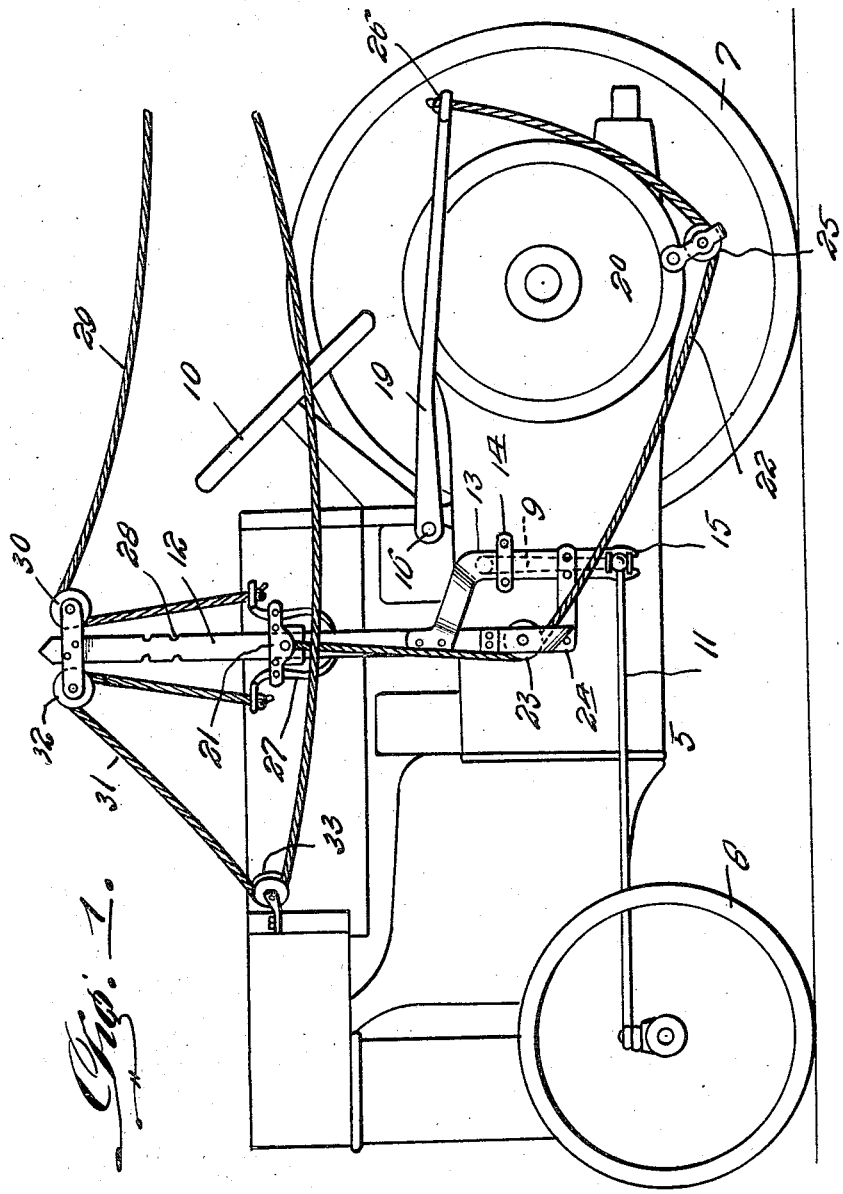

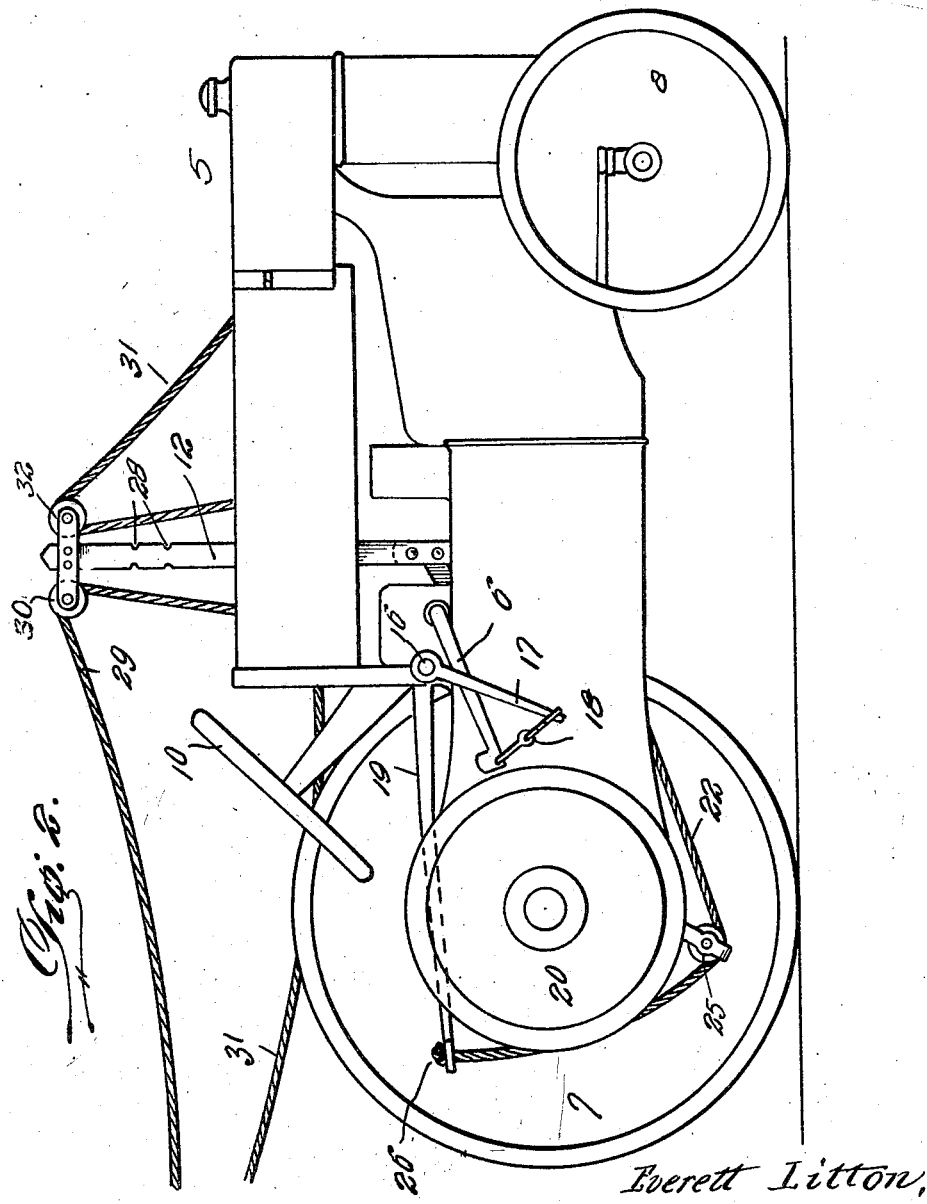

1,499,990

UNITED STATES PATENT OFFICE.

EVERETT LITTON, OF WOODHULL, ILLINOIS.

DISTANCE-CONTROL MECHANISM FOR TRACTORS.

Application filed July 31, 1923. Serial No. 654,832.

*To all whom it may concern:*

Be it known that EVERETT LITTON, a citizen of the United States, residing at Woodhull, in the county of Henry and State of Illinois, has invented certain new and useful Improvements in Distance-Control Mechanism for Tractors, of which the following is a specification.

This invention relates to attachments for tractors whereby the latter may be effectively and easily controlled from a point distant therefrom, whereby the operator may assume a position on the agricultural machine that is pulled by the tractor or may follow the tractor on the ground some distance rearwardly of the tractor and at the same time have the latter under perfect control at all times.

The primary object of the invention is to provide a device of the above kind which embodies simple and practical means under the control of two reins, the selective pulling of which will effect steering of the tractor in the desired direction, and the simultaneous pulling of which will throw the tractor out of gear or operation.

With the above general objects in view and others that will become apparent as the nature of the invention is better understood, the same consists in the novel form, combination and arrangement of parts hereinafter more fully described, shown in the accompanying drawing and claimed.

In the drawings wherein like reference characters indicate corresponding parts in the two views, Figure 1 is an elevational view of one side of a tractor equipped with a distance control mechanism constructed in accordance with the present invention, and Figure 2 is a view similar to Figure 1 looking at the other side of the tractor.

Referring more in detail to the drawings, 5 indicates a conventional form of tractor now in extensive use, and the same embodies a power plant, and driving mechanism which may be thrown out of operation for discontinuing the drive, by the depression of a rearwardly inclined clutch pedal 6, when the latter is depressed. This tractor also embodies rear driven supporting wheels 7 and front steering supporting wheels 8, the wheels 8 being steered through the medium of a depending arm 9 which is mounted at its upper end for longitudinal swinging movement and operatively connected to a steering wheel 10 and which has operative connection with the steering knuckle of the wheels 8 at its lower end by means of the usual construction including the longitudinal push rod 11.

In accordance with the present invention a lever 12 is provided which has a rearwardly and laterally offset lower member 13, and the member 13 is rigidly clamped as at 14 to one side of the arm 9 so that the major portion of the lever 12 projects upwardly from the arm 9 in a normal, substantially vertical position as shown.

The lower end of the member 13 is preferably bifurcated as at 15 to receive the outturned lower end of the arm 9 so as to cooperate with the clamp 14 in holding the members 9 and 13 against relative displacement. From this construction it will be seen that when the lever 12 is swung forwardly the arm 9 will be swung rearwardly for steering the tractor in one direction, while swinging of the lever 12 rearwardly will cause forward swinging movement of the arm 9 to steer the tractor in an opposite direction.

Adjacent the pivot of the clutch pedal 6 is a rock shaft 16 upon one end of which is fastened an arm 17 which depends to a point below the free end of the pedal 6, and a flexible connection 18 is provided between the ends of the members 6 and 17, as shown in Figure 2. A normally substantially horizontal relatively long arm 19 is attached to the rock shaft 16 and projects rearwardly therefrom to a point beyond the differential housing 20 of the tractor. A slide 21 is movable longitudinally on the lever 12 and has one end of the flexible member or cable 22 attached thereto, which cable passes downwardly around a guide pulley 23 mounted in a depending arm 24 of the lever 12. The cable 22 extends from the guide pulley 23 rearwardly under a further guide pulley 25 which is suitably attached to the differential housing 20 at the bottom of the latter, and then extends rearwardly and upwardly where it is attached as at 26 to the rear end of arm 19. It is thus apparent that when the slide 21 is pulled upwardly the cable 22 will be correspondingly pulled for depressing the arm 19 and causing downward swinging movement of the arm 17 rigidly connected therewith, whereupon the clutch pedal 6 will be depressed through the medium of the connection 18.

The slide 21 carries a pair of pivoted pawls 27 which are mounted upon transverse axes at the forward and rear edges of the lever 12 so that the lower inturned ends of these pawls are in position to engage the said edges of the lever 12 to restrain the slide 21 against movement on the lever 12 under certain conditions, the lever 12 being provided with suitable notches 28 into which the pawls may be moved.

The rear pawl 27 has its upper end attached to one end of a rein or flexible member 29 which extends upwardly therefrom and around a guide pulley 30 suitably mounted at the rear edge of the lever 12, the rein 29 passing from the pulley 30 rearwardly as shown and being of the desired length in accordance with the distance from the tractor at which the operator desires to control the latter. The upper end of the other pawl 27 is attached to one end of a second rein or cable 31 and passes upwardly over a further guide pulley 32 which is suitably mounted at the forward edge of the lever 12 near the upper end of the latter. The rein 31 passes from the pulley 32 forwardly around a guide pulley 33 which is suitably mounted upon the body of the tractor forwardly of the lever 12, and said rein 31 then extends rearwardly the same as the rein 29. By reason of this construction it will be seen that when both of the reins 29 and 31 are simultaneously pulled, the pawls 27 will be disengaged from the edges of the lever 12 and the slide 21 will be raised so as to exert a pull upon the cable 22 for depressing the clutch pedal 6 so as to throw the tractor out of gear in the manner above described. It will further be seen that when the rein 29 is pulled without pulling the rein 31 the upper end of the lever 12 will be swung rearwardly for steering the tractor in one direction, while when the pull is applied to the rein 31 without affecting the rein 29 a reverse swinging movement will be imparted to the lever 12 for steering the tractor in the opposite direction.

I have thus provided a very simple, practical and durable construction for the purposes outlined, which may be readily and cheaply installed upon tractors now in use and which may be operated with facility and ease by unskilled labor. Also, the device will in no way prevent the control of the tractor in the usual manner through direct operation of the clutch pedal 6 and steering wheel 10 in case the attachment is not required at any particular time, it being simply necessary that the reins 29 and 31 be placed out of the way at some desirable point on the tractor at that time.

Minor changes may be made without departing from the spirit and scope of the invention as claimed.

What I claim as new is:

A tractor control attachment including a lever having its lower end provided with means for attaching the same rigidly to the longitudinal swinging depending operating arm of the tractor steering mechanism, a slide movable longitudinally of said lever, means to operatively connect said slide to the clutch pedal of the tractor whereby upward movement of the slide will cause depression of said clutch pedal for throwing the tractor out of gear, and means associated with the lever and with the slide for selectively swinging the lever in either direction, said last-named means being simultaneously operable for raising the slide to operate the clutch pedal without swinging said lever, the connection between the slide and the clutch pedal including rigidly connected long and short arms, the short arm being flexibly connected to the clutch pedal, and the long arm being flexibly connected to the slide.

In testimony whereof I affix my signature.

EVERETT LITTON.